US012436860B2

(12) United States Patent
Yang et al.

(10) Patent No.: US 12,436,860 B2
(45) Date of Patent: Oct. 7, 2025

(54) USING PROPENSITY SCORE MATCHING TO DETERMINE METRIC OF INTEREST FOR UNSAMPLED COMPUTING DEVICES

(71) Applicant: MICROSOFT TECHNOLOGY LICENSING, LLC, Redmond, WA (US)

(72) Inventors: Connie Yang, Redmond, WA (US); Eamon Guthrie Cosgrove Millman, Bellevue, WA (US); Xiaoyu Chai, Bellevue, WA (US); Soheil Sadeghi, Redmond, WA (US); Omari Carter-Thorpe, Seattle, WA (US); Igor Borisov Peev, Port Angeles, WA (US); Steven Marcel Elza Wilssens, Redmond, WA (US); Tomas Aleksas Mereckis, Bellevue, WA (US); Alexander S. Weil, Redmond, WA (US); Stephen C. Rowe, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 954 days.

(21) Appl. No.: 17/562,875

(22) Filed: Dec. 27, 2021

(65) Prior Publication Data

US 2023/0205659 A1    Jun. 29, 2023

(51) Int. Cl.
*G06F 11/34*    (2006.01)
*G06F 18/22*    (2023.01)
(Continued)

(52) U.S. Cl.
CPC .......... *G06F 11/3409* (2013.01); *G06F 18/22* (2023.01); *G06F 18/24137* (2023.01); *G06F 18/24147* (2023.01); *G06N 20/20* (2019.01)

(58) Field of Classification Search
CPC ................ G06F 11/3409; G06F 18/22; G06F 18/24137; G06F 18/24147; G06F 11/3006;
(Continued)

(56) References Cited

U.S. PATENT DOCUMENTS 8,781,877 B2    7/2014 Kruger et al.
9,760,912 B2 *  9/2017 Kruglick ................ G06Q 10/10
(Continued)

FOREIGN PATENT DOCUMENTS

IN    20204103078    8/2020

OTHER PUBLICATIONS

Papadogeorgou, et al., "Adjusting for Unmeasured Spatial Confounding with Distance Adjusted Propensity Score Matching", In Journal of Biostatistics, Apr. 1, 2019, 17 Pages.
(Continued)

*Primary Examiner* — Hope C Sheffield
(74) *Attorney, Agent, or Firm* — Newport IP, LLC; Jacob P. Rohwer

(57) ABSTRACT

Disclosed herein is a system for leveraging telemetry data representing usage of a component installed on a group of sampled computing devices to confidently infer the quality of a user experience and/or the behavior of the component (e.g., an operating system) on a larger group of unsampled computing devices. The system is configured to use a propensity score matching approach to identify a sampled computing device that best represents an unsampled computing device using configuration data that is collected from both the sampled and unsampled computing devices. The quality of the user experience and/or the behavior of the component may be captured by a metric of interest (e.g., a QoS value). Accordingly, the system is configured to use the known metric of interest, determined from the telemetry data
(Continued)

collected for the sampled computing device, to determine or predict the metric of interest for the unsampled computing device.

20 Claims, 7 Drawing Sheets

(51) Int. Cl.
  *G06F 18/2413* (2023.01)
  *G06N 20/20* (2019.01)
(58) Field of Classification Search
  CPC .. G06F 11/3051; G06F 11/3452; G06N 20/20
  See application file for complete search history.

(56) References Cited

U.S. PATENT DOCUMENTS

| | | |
|---|---|---|
| 2015/0348070 A1 | 12/2015 | Boettcher |
| 2017/0193529 A1 | 7/2017 | Sheppard et al. |
| 2017/0351964 A1* | 12/2017 | Gross ...................... G06F 13/37 |
| 2019/0362242 A1 | 11/2019 | Pillai et al. |
| 2021/0225513 A1 | 7/2021 | Manrai et al. |
| 2021/0327108 A1* | 10/2021 | Kumari ................... G06F 17/11 |

OTHER PUBLICATIONS

Rosenbaum, et al., "The central role of the propensity score in observational studies for causal effects", In Journal Biometrika, vol. 70, No. 1, Apr. 1, 1983, pp. 41-55.

Ye, Leihua, "An Ultimate Guide to Matching and Propensity Score Matching", Retrieved from: https://towardsdatascience.com/an-ultimate-guide-to-matching-and-propensity-score-matching-644395c46616, Jun. 18, 2021, 19 Pages.

* cited by examiner

USING PROPENSITY SCORE MATCHING TO DETERMINE METRIC OF INTEREST FOR UNSAMPLED COMPUTING DEVICES

BACKGROUND

Providing an optimal user experience is an important aspect for network-based systems (e.g., cloud service providers). In many scenarios, a network-based system may provide a service to thousands or millions of users (e.g., customers, clients) geographically dispersed across various regions (e.g., states, provinces, countries, continents, company-defined areas). In some examples, this service can relate to maintaining, updating, and/or providing data to a component, installed on computing devices (e.g., user devices, servers), in order to improve the user experience and/or to provide an optimal user experience. The component may comprise a product or a platform, or be part of the product or the platform. For instance, the component may be an operating system, an application, a Web browser, or another device function installed on a computing device. Accordingly, updated code and/or other mechanisms configured to maintain, correct, add, remove, and/or improve features of the component can be deployed.

To determine how to improve the user experience and/or to provide the optimal user experience, a service provider may collect and analyze data indicative of component "usage". This data is used to generate insights with respect to how to optimize the component for a particular user, or alternatively, for a category or group of similar users. Generally, this usage data tracks the day-to-day use of the component (e.g., which features are used, how often a feature is used, the manner in which a feature is used). However, there are challenges to collecting and analyzing this usage data from every computing device on which a component may be installed. The challenges can stem from resource and cost limitations related to collecting and analyzing data from millions, or perhaps, billions of computing devices. The challenges can additionally or alternatively stem from privacy regulations that, while reasonable and effective, limit how a service provider can collect this usage data. Examples of these privacy regulations implemented by various governmental agencies include the European Union's General Data Protection Regulation, the California Consumer Privacy Act, Japan's Act on Protection of Personal Information, South Korea's Personal Information Protection Act, etc.

Due to these challenges, service providers often implement a sampling policy that enables the collection of a portion of the usage data. The sampling policy helps address the aforementioned resource and cost limitations. Moreover, the sampling policy may be established to comply with privacy regulations by requiring a user of a computing device to opt in to the sampling (e.g., provide authorization) before the service provider can collect the usage data from the computing device. Because only a small group of computing devices are sampled in accordance with the sampling policy, it is difficult for the service provider to fully understand the usage of a component across a larger group of computing devices. More specifically, the service provider understands the usage of the component across the smaller group of computing devices that have been sampled, but this sampled usage typically does not accurately represent the larger population of users of the component. For example, the sampled computing devices may overrepresent or underrepresent certain user characteristics (e.g., age range, location, privacy consciousness) and/or device characteristics. Consequently, the usage data of the sampled computing devices alone may not provide a good representation of the unsampled computing devices, and for this reason, it is difficult for a service provider to fully understand how a component is being used across a larger group of computing devices.

It is with respect to these and other considerations that the disclosure made herein is presented.

SUMMARY

The techniques disclosed herein implement a system that enables a service provider to leverage telemetry data representing usage of a component installed on a group of sampled computing devices to confidently infer the quality of a user experience and/or the behavior of the component on a larger group of unsampled computing devices. Because telemetry data represents usage of the component, the telemetry data may alternatively be referred to herein as "usage" data. As mentioned above, the component may comprise a product or a platform, or be part of the product or the platform. For instance, the component may be an operating system, an application, a Web browser, or another device function installed on a computing device. As further discussed herein, the system is configured to use a propensity score matching approach to identify a sampled computing device that best represents an unsampled computing device. Stated alternatively, the system disclosed herein determines, or predicts, that the unsampled computing device "looks like" the sampled computing device. The aforementioned identification and/or determination is based on configuration data that is collected from a group of computing devices that is larger than a group of computing devices that have opted in to providing telemetry data.

The configuration data can include attributes that indicate the way in which the component is configured on the computing device. Alternatively or additionally, the attributes can indicate general information about the computing device. The configuration data includes settings that do not typically change day-to-day, if at all, and therefore the configuration data may be referred to as "static" attributes. Further, because the configuration data is not particularly sensitive (e.g., it cannot be used to identify a particular user or the behavior of the user), the configuration data may be collected by a service provider without requiring users to opt in to providing the configuration data. A service provider can collect the configuration data in a periodic manner (e.g., every week, every month). In various examples, an attribute of the configuration data can indicate a geographic region in which the computing device is located, a version of a component installed on the computing device, a type of computing device (e.g., a form factor such as a smartphone device, a tablet device, a laptop device, a desktop device, a server device), and/or a default Web browser established for the computing device.

The telemetry data is collected by a service provider more frequently (e.g., with each use of the component) when compared to the configuration data. For instance, the telemetry data can include which features are used during a session, the manner in which a feature is used during the session, which Websites a user visited, which network data is accessed, which computer programs or applications are used during a session, etc. Moreover, the telemetry data collected from a sampled computing device can be used by a service provider to determine a metric of interest. For example, the metric of interest may be a Quality of Service (QOS) value (e.g., a Device Interruption Rate) established in accordance with any one of various QOS models. Accordingly, these QoS models can be used by a service provider to capture a holistic, device-centric measure related to the performance and/or quality of a component installed on the computing device. In another example, the metric of interest may be a recommendation value or recommendation ranking configured to identify and push an application download recommendation to an unsampled computing device based on a popular application frequently used on a sampled computing device. Consequently, service providers can use different metrics of interest (e.g., generally accepted metrics in the industry, internally developed metrics customized for a particular business or product) as a tool to improve the component and optimize the user experience for every user of a computing device on which the component is installed, for a category of users of computing devices on which the component is installed, and/or for a particular user of a computing device on which the component is installed. Moreover, the propensity score matching approach described herein enables a service provider to enable this improvement for all computing devices, not only the ones that have opted in to providing telemetry data.

The system is configured to, once it uses the propensity score matching approach to identify a sampled computing device that best represents an unsampled computing device, use the known metric of interest for the sampled computing device to determine, or predict, the metric of interest for the unsampled computing device. For example, the propensity score for the unsampled computing device can be used as a multiplier which is applied to the known metric of interest of the sampled computing device in order to determine, or predict, the metric of interest for the unsampled computing device. Alternatively, the propensity score for the unsampled computing device can be used as a variable in a function used to transform the known metric of interest for the sampled computing device into a metric of interest for the unsampled computing device. Accordingly, the approach disclosed herein addresses the challenges that prevent the collection and analysis of telemetry data from a large group of computing devices on which a component is installed.

As described by the examples provided herein, the disclosed system is configured to collect, from each computing device in a set of computing devices, configuration data for a component (e.g., an operating system) installed on the computing device. This set of computing devices is divided in to a first subset of sampled computing devices and a second subset of unsampled computing devices. As described above, in one example, a sampled computing device is one in which a user (e.g., an owner of the computing device) has opted in to providing telemetry data indicative of usage of the component. In contrast, an unsampled computing device is one in which a user has not opted in to (e.g., opted out of or not explicitly opted in to) providing the telemetry data indicative of the usage of the component. The system is configured to collect, from each sampled computing device, the telemetry data indicative of the usage of the operating system. Generally, this telemetry data tracks the day-to-day use of the component. Note that while the configuration data is collected from the unsampled computing devices, the telemetry data is not collected from the unsampled computing devices.

The system is configured to then calculate a propensity score for each computing device in the larger group of computing devices. As further described herein, the propensity score represents a normalized probability (e.g., a value between and/or including 0 and 1) that a given computing device is like, or similar to, other computing devices based on the configuration data collected from each computing device. The propensity score further predicts whether the given computing device is a sampled computing device that has opted in to providing the telemetry data, T, (e.g., if so a label of T=1 is applied) or an unsampled computing device that has not opted in to providing the telemetry data (e.g., if so a label of T=0 is applied). Propensity score matching does not use the telemetry data or the knowledge of the service provider that a computing device is a sampled or an unsampled computing device. Rather, propensity score matching groups all the computing devices together for the analysis in order to remove the bias that would result if the sampled and unsampled computing devices are separated and compared to each other for the analysis. That is, the bias is likely to surface when the configuration data from known sampled computing devices is compared to the configuration data from known unsampled computing devices.

The propensity scores may be calculated by applying a regression model to covariates X, an example of which is as follows:

$$T\sim X, \text{ where } \pi_i = P(T=1/X_i)$$

The covariates X are the individual attributes of the configuration data that are common to, and collected from, both the sampled and unsampled computing devices. Furthermore, $\pi_i$ is the propensity score calculated for each computing device.

The label T can be used to train the regression model via a supervised machine learning approach. That is, the label T that is associated with a given computing device can be compared to a known indicator of whether the given computing device is actually a sampled computing device that has opted in to providing the telemetry data or is actually an unsampled computing device that has not opted in to providing the telemetry data. Accordingly, this comparison can serve as training data that can be used to update the regression model so it can better predict whether the given computing device is a sampled computing device that has opted in to providing the telemetry data (e.g., apply a label of T=1) or an unsampled computing device that has not opted in to providing the telemetry data (e.g., apply a label of T=0).

Once the propensity scores are calculated, the system uses a matching algorithm to complete the propensity score matching. The matching algorithm uses the propensity scores to identify a match, or a pair, that includes a sampled computing device and an unsampled computing device. The goal of the matching is to determine a sampled computing device that best represents an unsampled computing device. In other words, the system identifies which sampled computing device that an unsampled computing device looks most like considering the configuration data. In one example, k-nearest neighbors can be used to identify a match based on determined distances between propensity scores. That is, a sampled computing device that is matched or paired with an unsampled computing device using k-nearest neighbors is the one with a propensity score that has the closest distance to the propensity score of the unsampled computing device. In other examples, the matching algorithm can include caliper matching, radius matching, or Mahalanobis matching.

The techniques disclosed herein provide a number of features that improve existing computing devices. For example, compute resources are conserved due to the efficiency of the propensity score matching approach disclosed herein because it scales and condenses information for millions, if not billions, of devices. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for leveraging telemetry data representing usage of a component installed on a group of sampled computing devices to confidently infer the quality of a user experience and/or the behavior of the component on a larger group of unsampled computing devices. The component may comprise a product or a platform, or be part of the product or the platform. For instance, the component may be an operating system, an application, a Web browser, or another device function installed on a computing device. The disclosed system is configured to use a propensity score matching approach to identify a sampled computing device that best represents an unsampled computing device using configuration data that is collected from both the sampled and unsampled computing devices. The quality of the user experience and/or the behavior of the component may be captured by a metric of interest (e.g., a Quality of Service (QOS) value). Accordingly, the system is configured to use the known metric of interest, determined from the telemetry data collected for the sampled computing device, to determine, or predict, the metric of interest for the unsampled computing device. Consequently, the approach disclosed herein addresses the challenges that prevent the collection and analysis of telemetry data from a large set of computing devices on which a component is installed.

Various examples, scenarios, and aspects that use telemetry data collected for sampled computing devices to effectively determine, or predict, a metric of interest for an unsampled computing device, are described below with reference to FIGS. 1-7.

Figure 1:
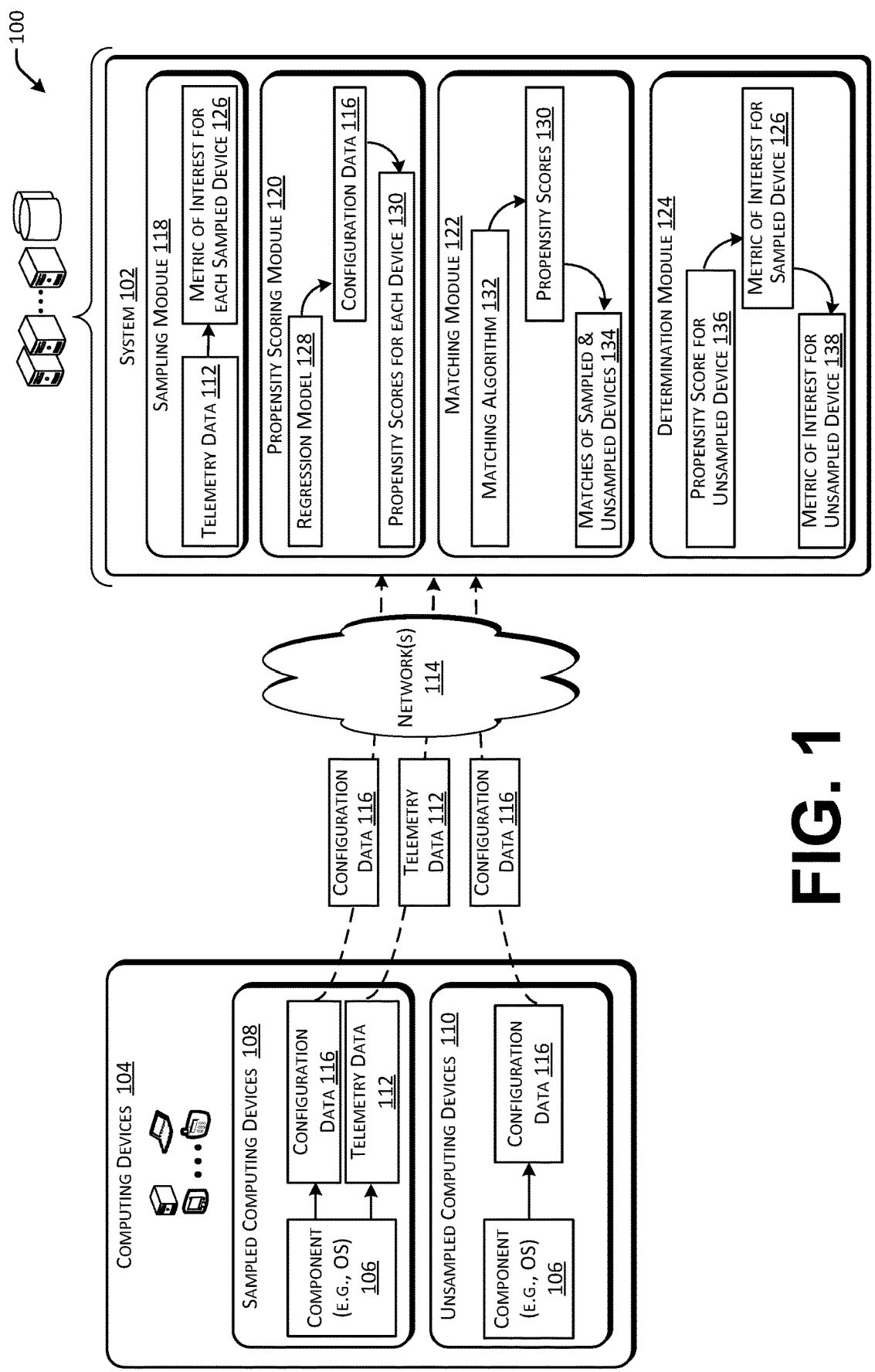
FIG. 1 is a diagram illustrating an example environment in which a system is configured to leverage telemetry data representing usage of a component installed on a group of sampled computing devices to confidently infer the quality of a user experience and/or the behavior of the component on a larger group of unsampled computing devices.

FIG. 1 is a diagram illustrating an example environment 100 in which a system 102 is configured to leverage telemetry data representing usage of a component installed on a group of sampled computing devices to confidently infer the quality of a user experience and/or the behavior of the component on a larger group of unsampled computing devices. FIG. 1 illustrates a set of computing devices 104 on which a component 106 is installed. As described above, the component 106 may comprise a product or a platform, or be part of the product or the platform. For instance, the component 106 may be an operating system, an application, a Web browser, or another device function installed on the computing devices 104. Moreover, the component 106 is one that is managed and/or maintained by a service provider that operates the system 102.

The set of computing devices 104 is divided into two subsets: a subset of sampled computing devices 108 (e.g., an individual sampled computing device may also be referenced by 108) and a subset of unsampled computing devices 110 (e.g., an individual unsampled computing device may also be referenced by 110). A sampled computing device 108 is one that provides telemetry data 112 indicative of usage of the component 106. For example, a sampled computing device 108 may be one in which a user (e.g., an owner of the device) has opted in to providing telemetry data 112 indicative of usage of the component 106. In another example, a sampled computing device 108 may be one that has been selected by a service provider in accordance with a sampling policy that selects a predetermined percentage of devices to sample. The sampling policy may be implemented due to resource constraints associated with collection of telemetry data. There may be additional or alternative reasons to sample computing devices, including to save costs, to conserve time, etc. Generally, this telemetry data 112 tracks the day-to-day use of the component 106. For instance, the telemetry data 112 can include which features are used during a session, the manner in which a feature is used during the session, which Websites a user visited, which network data is accessed, which computer programs or applications are used during a session, etc. Accordingly, a sampled computing device 108 is configured to produce the telemetry data 112 and provide the telemetry data 112 to the system 102 over network(s) 114.

In contrast, an unsampled computing device 110 is one that does not provide telemetry data indicative of the usage of the component 106. For example, an unsampled computing device 110 may be one in which a user has not opted in to (e.g., opted out of or not explicitly opted in to) providing the telemetry data indicative of the usage of the component 106. In another example, an unsampled computing device 110 may be one that has not been selected by a service provider in accordance with a sampling policy. Consequently, FIG. 1 does not show telemetry data being communicated over network(s) 114 for the unsampled computing devices 110.

However, both the sampled computing devices 108 and the unsampled computing devices 110 are configured to produce configuration data 116 and provide the configuration data 116 to the system 102 over network(s) 114. The configuration data 116 can include attributes that indicate the way in which the component 106 is configured on the computing devices 104. Additionally and alternatively, the attributes can indicate general information about the computing devices 104. Consequently, the configuration data 116 includes settings that do not typically change day-to-day, or if at all, and therefore the configuration data 116 may be referred to as including "static" attributes. In this way, the configuration data 116 is different than the telemetry data 112 that is produced and/or collected more frequently (e.g., with each use of the component 106) compared to the configuration data 116. Further, the configuration data 116 is not typically subjected to privacy regulations. Example attributes that comprise the configuration data 116 are further discussed herein with respect to FIG. 2.

As shown, the system 102 is configured to collect the telemetry data 112 produced by each sampled computing device 108. Moreover, the system 102 is configured to collect the configuration data 116 produced by each sampled computing device 108 and each unsampled computing device 110. In one example, the system 102 may be configured to collect the configuration data 116 in accordance with a predefined schedule (e.g., every week, every month), while the system may be configured to collect the telemetry data 112 in real-time or after each use of the component, as long as there is a network connection to the system 102.

The system 102 includes various modules, e.g., a sampling module 118, a propensity scoring module 120, a matching module 122, and a prediction module 124, each of which is further described herein. The number of illustrated modules is just an example, and the number can vary higher or lower. That is, functionality described herein in association with the illustrated modules can be performed by a fewer number of modules or a larger number of modules on one network device (e.g., a server) of system 102 or spread across multiple network devices in the system 102.

The sampling module 118 is configured to use the telemetry data 112 collected from each sampled computing device 108 to determine, or calculate, a metric of interest 126. For example, the metric of interest 126 may be a QoS value (e.g., a Device Interruption Rate) established in accordance with any one of various QoS models. Accordingly, these QoS models can be used by the system 102 to capture a holistic, device-centric measure related to the performance and/or quality of a component 106 installed on individual sampled computing devices 108. In another example, the metric of interest 126 may be a recommendation value or recommendation ranking configured to identify and push an application download recommendation to an unsampled computing device 110 based on a popular application frequently used on a "similar looking" sampled computing device 108. Consequently, different service providers may use different metrics of interest (e.g., generally accepted metrics in the industry, internally developed metrics customized for a particular business or product) as a tool to improve the component 106 and optimize the user experience for every user of a computing device on which the component is installed, for a category of users of computing devices on which the component is installed, and/or for a particular user of a computing device on which the component is installed.

The propensity scoring module 120 is configured to use a regression model 128 to calculate propensity scores 130 for each computing device 104 in the set of computing devices 104. The propensity score 130 represents a normalized probability (e.g., a value between and/or including 0 and 1) that a given computing device is like, or similar to, other computing devices based on the configuration data 116 collected from each computing device 104 in the set of computing devices 104. The propensity score further predicts whether the given computing device is a sampled computing device that has opted in to providing the telemetry data, T, (e.g., if so a label of T=1 is applied) or an unsampled computing device that has not opted in to providing the telemetry data (e.g., if so a label of T=0 is applied). The propensity score calculations do not use the telemetry data or the knowledge that a computing device is a sampled or an unsampled computing device. Rather, propensity scoring groups all the computing devices 104 together for the analysis in order to remove the bias that would result if the sampled and unsampled computing devices are separated and compared to each other for the analysis. That is, the bias is likely to surface when the configuration data 116 from known sampled computing devices 108 is compared to the configuration data 116 from known unsampled computing devices 110.

As shown in FIG. 1, the propensity scoring module 120 calculates the propensity scores 130 by applying the regression model 128 to the attributes, or covariates X, of the configuration data 116, an example of which is as follows:

$$T \sim X, \text{ where } \pi_i = P(T=1/X_i)$$

Figure 2:
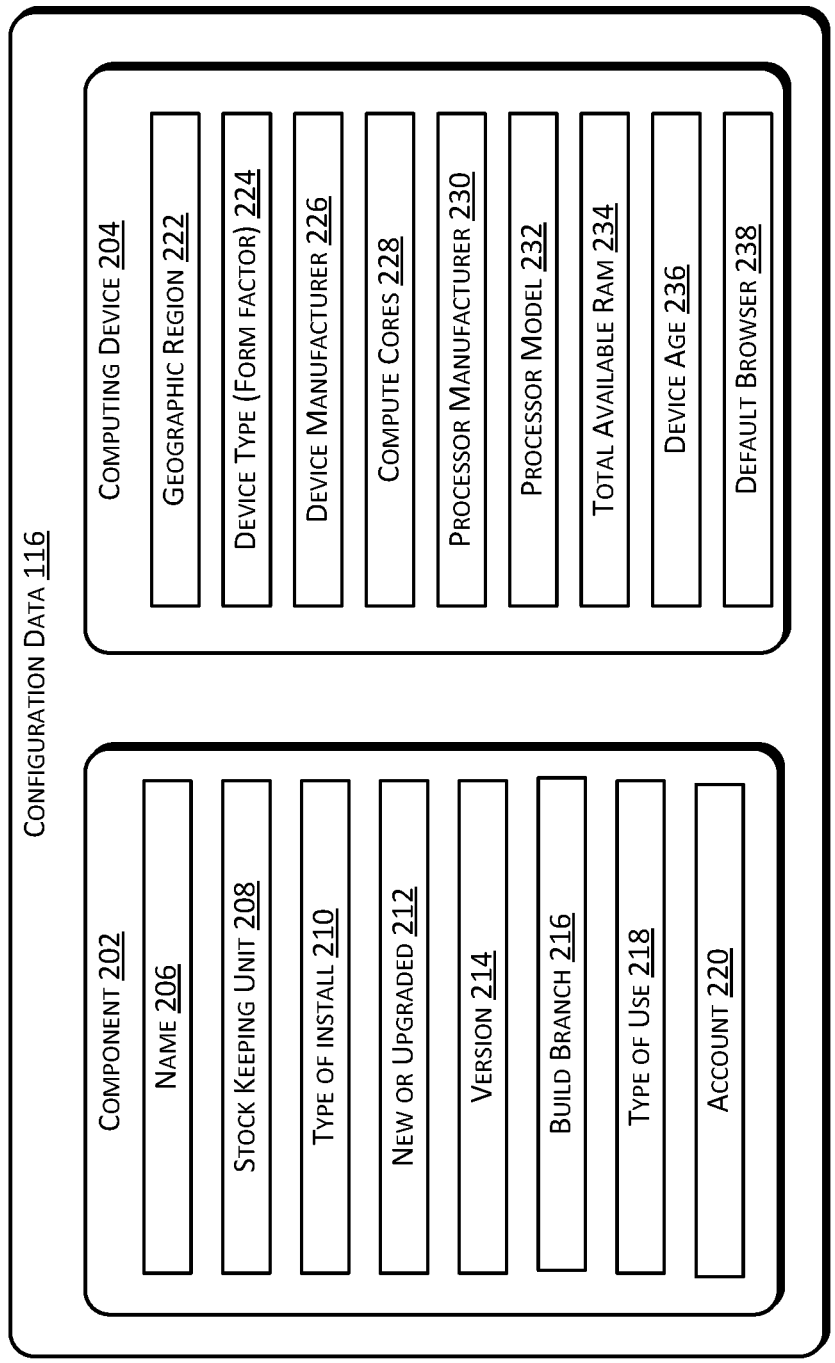
FIG. 2 is a diagram that illustrates example attributes that can comprise the configuration data.

The covariates X can be some or all of the individual attributes described herein with respect to FIG. 2. Furthermore, $\pi_i$ is the propensity score 130 calculated for each computing device.

Once the propensity scores are calculated, the matching module 122 uses a matching algorithm 132 to complete the propensity score matching. The matching algorithm 132 uses the propensity scores 130 for the computing devices 104 to identify a match 134, or a pair, that includes a sampled computing device and an unsampled computing device. The goal of the matching is to determine a sampled computing device 108 that best represents an unsampled computing device 110. In other words, the matching module 122 identifies which sampled computing device 108 that an unsampled computing device 110 looks most like considering the configuration data 116. This matching is implemented for each unsampled computing device 110. In one example, k-nearest neighbors may be the matching algorithm 132 used to identify a match 134 based on determined distances between propensity scores 130. That is, a sampled computing device 108 that is matched or paired with an unsampled computing device 110 using k-nearest neighbors is the one with a propensity score that has the closest distance to the propensity score of the unsampled computing device. In other examples, the matching algorithm 132 may include caliper matching, radius matching, or Mahalanobis matching.

The determination module 124 receives the matches 134, or pairs, from the matching module 122 in order to determine the metric of interest for each of the unsampled computing devices 110. As shown, the determination module 124 is configured to take the propensity score 136 for an individual unsampled computing device and use the known metric of interest 126, which has already been determined from the telemetry data 112 collected for the matched sampled computing device 108, to predict the metric of interest 138 for the unsampled computing device. For example, the propensity score 136 for the unsampled computing device can be used as a multiplier which is applied to the known metric of interest 126 of the matched sampled computing device in order to predict the metric of interest 138 for the unsampled computing device. Alternatively, the propensity score 136 for the unsampled computing device can be used as a variable in a function used to transform the known metric of interest 126 for the matched sampled computing device into a predicted metric of interest 138 for the unsampled computing device.

FIG. 2 is a diagram that illustrates example attributes that can comprise the configuration data 116. The attributes can provide an indication of the way in which the component is configured on the computing device 104. Alternatively, the attributes can provide an indication related to more general information about the computing device 104. Consequently, the configuration data 116 includes settings that do not typically change day-to-day, or if at all, and therefore the configuration data 116 may be referred to as "static" attributes.

As illustrated in FIG. 2, the attributes of the configuration data 116 may be separated into ones that are specific to the component 202 and ones that are related to the computing device 204. While discussing some of the example attributes provided herein, reference may be made to an operating system as the component that is installed on the computing devices 104. However, it is understood that some or all of the example attributes can apply to other types of components installed on computing devices 104 as well (e.g., a stand-alone or legacy application, a Web browser, a suite of applications).

As shown in FIG. 2, a first attribute 206 for the component 202 can include a name. The name can reflect a service provider's description of the component (e.g., "WINDOWS 10", "IOS 13", "ANDROID KITKAT").

A second attribute 208 for the component 202 can include a stock keeping unit (SKU). The SKU is an identifier that maps to different configurations of the component, which may be tailored to specific customer needs (e.g., WINDOWS may have different SKUs for Home, Professional, Enterprise, Server, Datacenter).

A third attribute 210 for the component 202 can include a type of install. The type of install refers to the way in which a component was installed on the computing device (e.g., through a boot from a USB device, through a network update/download, through another form of media such as a DVD).

A fourth attribute 212 for the component 202 can include an indication of whether the component was initially installed when the computing device was purchased as a new device, or whether the computing device was upgraded to include the component sometime after it was purchased as a new device. Alternatively stated, this attribute 212 refers to the service provider being able to differentiate between users bringing an older computing device up to a most recent version of the component and users that purchased a new computing device that was pre-loaded with the most recent version of the component.

A fifth attribute 214 for the component 202 can include a version of the component. For example, operating systems such as WINDOWS 10 have many releases over time that can be identified as separate versions.

A sixth attribute 216 for the component 202 can include a build branch. The build branch references an internal structure related to how a service provider or business manages source code. More specifically, the service provider or business can assign different meanings to different values: a build branch of "rs_prerelease" indicates it is not a retail release of the component while a build branch of "rs_release" indicates it is a retail release.

A seventh attribute 218 for the component 202 can include an indication of a type of use of the component. For instance, based on engagement, this attribute 218 can reflect whether the component is used for different engagement categories, e.g., gaming, productivity, browsing, or streaming. In some examples, the type of use can distinguish within an individual engagement category at a more granular level—is the user a "casual" gamer (e.g., the user typically plays casual games like CANDY CRUSH) or a "non-casual" gamer (e.g., the user typically plays non-casual games like LEAGUE of LEGENDS).

An eighth attribute 220 for the component 202 can include an indication of whether the component (e.g., a WINDOWS operating system) is registered to an account hosted and maintained by the service provider that maintains the system 102 and the component (e.g., a MICROSOFT account).

On the right side, a first attribute 222 for the computing device 204 can include a geographic region in which the computing device is typically located. The geographic regions can be of any size and/or can be defined by pre-established boundaries or borders (e.g., counties, states, countries, continents). Alternatively, the geographic regions can be defined by boundaries established by the service provider for organizational purposes (e.g., Eastern United States, Western United States, Eastern Europe, Western Europe).

A second attribute 224 for the computing device 204 can include a device type. This attribute describes a form factor for the computing device (e.g., a smartphone, a laptop, a server, a desktop, a convertible, a tablet).

A third attribute 226 for the computing device 204 can include a device manufacturer. This attribute identifies a company that produced the computing device (e.g., LENOVO, DELL, SAMSUNG).

A fourth attribute 228 for the computing device 204 can include a number of compute cores. This attribute reflects the number of compute cores in the processor(s) (e.g., one CPU, two CPUs, three CPUs).

A fifth attribute 230 for the computing device 204 can include a processor manufacturer. This attribute identifies the company that developed the processor(s) (e.g., INTEL, ADVANCED MICRO DEVICES, APPLE, ARM).

A sixth attribute 232 for the computing device 204 can include a processor model. This attribute is chosen by the processor manufacturer. For INTEL processors, this attribute can reflect the use of Xeon or Core (e.g., i5, i7) products.

A seventh attribute 234 for the computing device 204 can include the total available random access memory (RAM). This attribute describes the device configuration with respect to an amount of RAM that is available for use.

An eighth attribute 236 for the computing device 204 can include a device age. This attribute is an estimate of how long the computing device has been in use.

A ninth attribute 238 for the computing device 204 can include a default browser. This attribute reflects a user or install setting as to the primary Web browser.

The attributes discussed above are provided as examples only. It is understood that not all the attributes may be collected as part of the configuration data 116. Moreover, it is understood that other attributes may be collected as part of the configuration data 116. It is noted that some attributes may provide a stronger signal with respect to metric predictions than others. The strength of the signal may depend on the type of component and/or the metric of interest being determined by the system 102. In one example where the component is an operating system, the strongest attributes may include the geographic region 222 in which the computing device is located, a version 214 of the operating system installed on the computing device, whether or not the user has registered or associated an account 220 of the service provider with the operating system, and a default browser 238 the operating system used to perform requested actions.

Figure 3:
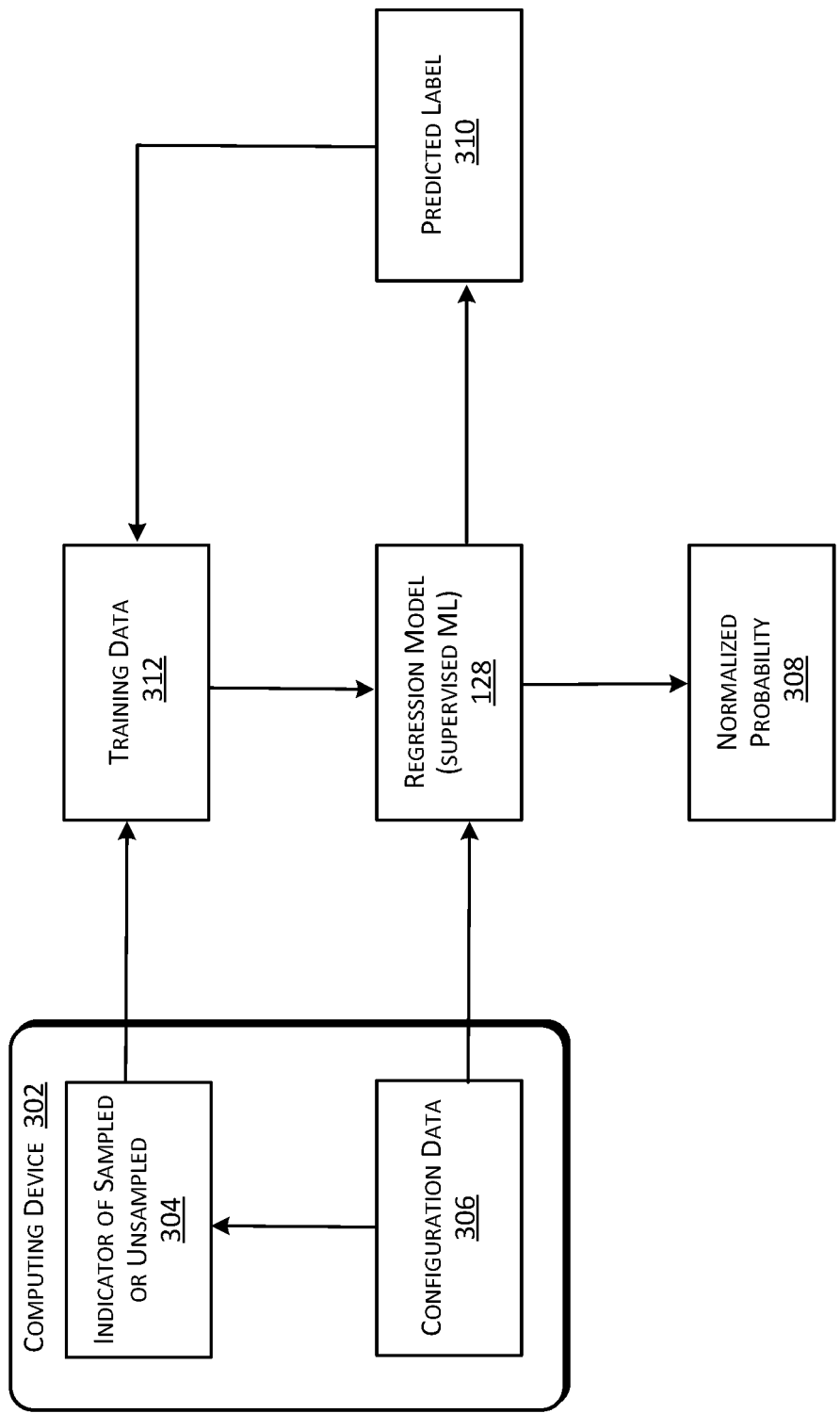
FIG. 3 illustrates a diagram that captures how the propensity scoring uses training data to improve (e.g., train) a regression model via a supervised machine learning algorithm.

FIG. 3 illustrates a diagram that captures how the propensity scoring uses training data to improve (e.g., train) the regression model via a supervised machine learning algorithm. As shown, FIG. 3 includes a computing device 302 (e.g., one of computing devices 104). The propensity scoring module 120 is able to configure an indicator 304 of whether the computing device 302 is known to be a sampled computing device or an unsampled computing device based on whether the computing device 302 provides telemetry data.

As discussed above, the computing device 302 provides an instance of configuration data 306 to a regression model 128 implemented by the propensity scoring module 120. The regression model 128 is configured to calculate a propensity score, or a normalized probability 308 (e.g., a value between and/or including 0 and 1) that the computing device 302 is like, or similar to, other computing devices 104 that have the component installed based on the instance of configuration data 306 and the other instances of configuration data 116 collected from all the computing devices 104. The regression model 128 further predicts whether the computing device 302 is a sampled computing device that has opted in to providing the telemetry data or an unsampled computing device that has not opted in to providing the telemetry data. This prediction produces a label T 310 where T=0 if the computing device 302 is predicted to be an unsampled computing device and T=1 if the computing device 302 is predicted to be a sampled computing device.

The label T 310 can be used to train the regression model 128 via a supervised machine learning approach. That is, the label T 310, that is predicted for the computing device 302, can be compared to the known indicator 304 of whether the computing device 304 is actually a sampled computing device that has opted in to providing the telemetry data or is actually an unsampled computing device that has not opted in to providing the telemetry data. Accordingly, this comparison can yield whether the prediction and label are correct and can serve as training data 312 that can be used to update the regression model 128 so it can better predict whether the next computing device is a sampled computing device that has opted in to providing the telemetry data (e.g., apply a label of T=1) or an unsampled computing device that has not opted in to providing the telemetry data (e.g., apply a label of T=0).

Figure 4:
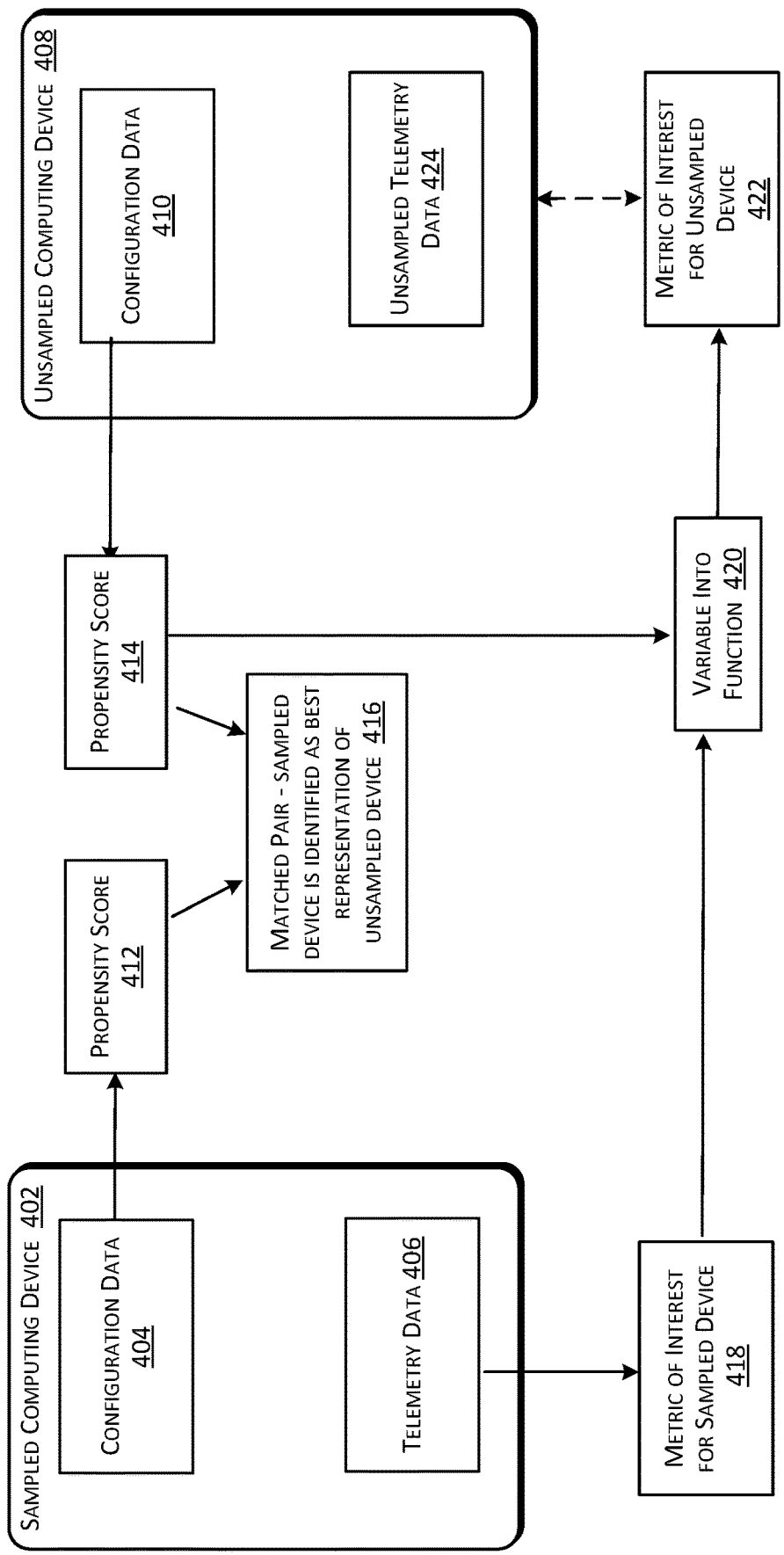
FIG. 4 illustrates a diagram that captures how the propensity scores for a matched pair of an unsampled computing device and a sampled computing device can be used to predict a metric of interest for the unsampled computing device.

FIG. 4 illustrates a diagram that captures how the propensity scores for a matched pair of an unsampled computing device and a sampled computing device can be used to predict a metric of interest for the unsampled computing device. As shown, FIG. 4 includes a sampled computing device 402 (e.g., one of sampled computing devices 108) that produces and provides both an instance of configuration data 404 and an instance of telemetry data 406, as well as an unsampled computing device 408 (e.g., one of unsampled computing devices 110) that produces and provides only an instance of the configuration data 410. The configuration data 116 collected for all the computing devices 104 is used calculate a propensity score 412 for the sampled computing device 402, considering the instance of the configuration data 404. Similarly, the configuration data 116 collected for all the computing devices 104 is used calculate a propensity score 414 for unsampled computing device 408, considering the instance of the configuration data 410.

Propensity score matching is implemented on the propensity scores 412, 414 (and all the propensity scores for computing devices 104) to determine that sampled computing device 402 and unsampled computing device 408 are a matched pair 416. In other words, it is predicted that the unsampled computing device 408 is best represented by the sampled computing device 402, which is identified amongst the subset of sampled computing devices 108.

Furthermore, FIG. 4 illustrates how the instance of telemetry data 406 for sampled computing device 402 is used to calculate a metric of interest 418 for the sampled computing device 402. Provided this scenario, FIG. 4 shows that the propensity score 414 for the unsampled computing device 408 can be provided as a variable into a function 420 that also uses the metric of interest 418 for the sampled computing device 402, in order to predict a metric of interest 422 for the unsampled computing device 408. This prediction helps generate insights into the use and/or behavior of a component installed on the unsampled computing device 408 that has opted out of providing telemetry data (e.g., the telemetry data is unsampled 424). Consequently, the insights can be used by the service provider to improve the component. In one example, the improvement is a more general improvement for all the devices. In another example, the improvement can be a customized improvement for a categorized group of users, or even a specific user.

Figure 5:
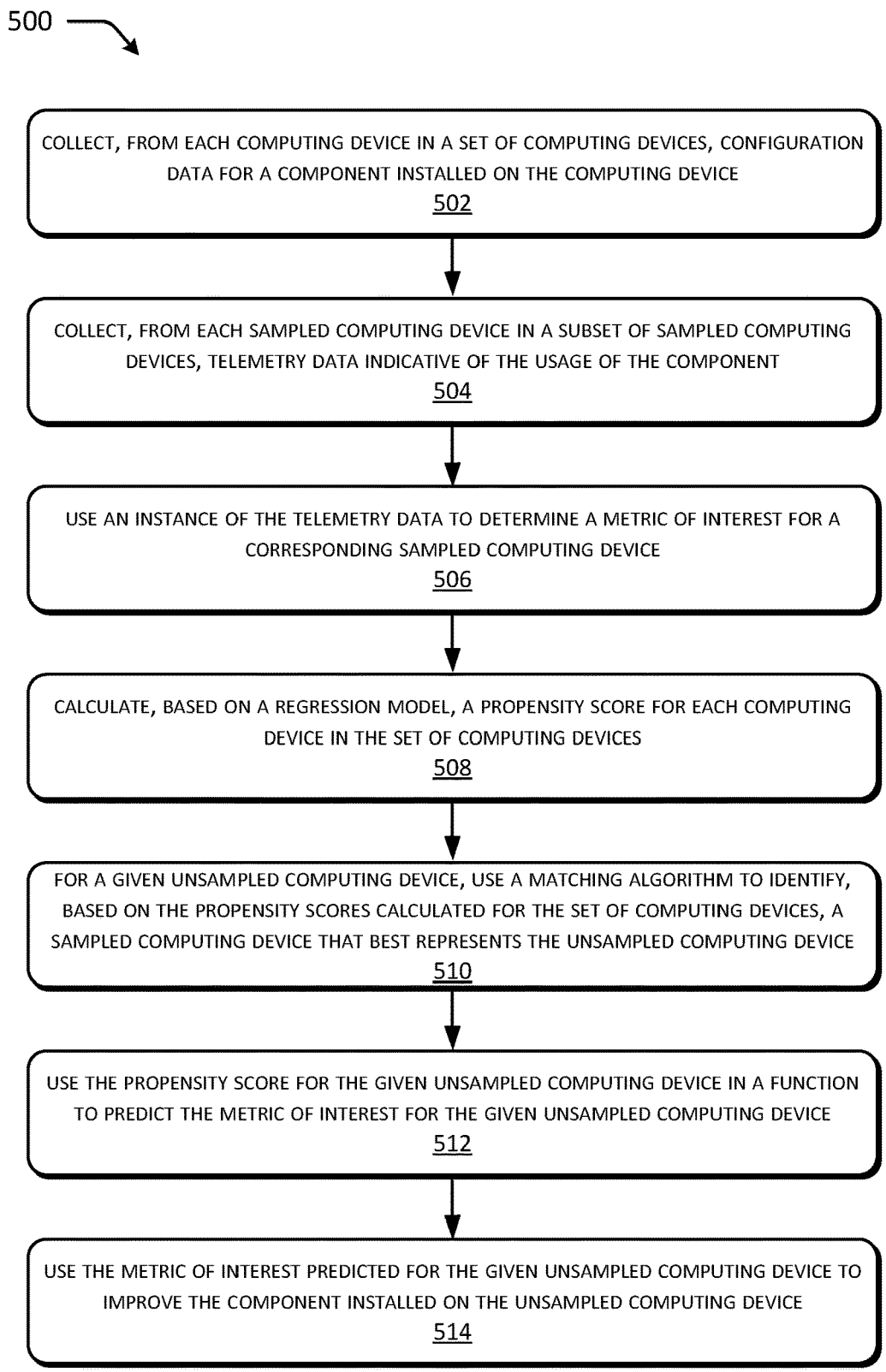
FIG. 5 is a flow diagram of an example method for leveraging telemetry data representing usage of a component installed on a group of sampled computing devices to confidently infer the quality of a user experience and/or the behavior of the component on a larger group of unsampled computing devices.

FIG. 5 is a flow diagram showing a routine 500 that illustrates aspects of the operation of the mechanism described with reference to FIGS. 1-4, according to one embodiment disclosed herein. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also contemplated that one or more of the provided operations is modified or omitted.

The routine 500 begins at operation 502, where configuration data for a component installed on the computing device is collected from each computing device in a set of computing devices on which the component is installed. At operation 504, telemetry data for the component is collected from each sampled computing device in a subset of sampled computing devices that have opted in to providing the telemetry data. At operation 506, an instance of the telemetry data is used to determine a metric of interest for a corresponding sampled computing device. This is repeated for each sampled computing device that provides telemetry data.

At operation 508, a regression model is used to calculate a propensity score for each computing device in the set of computing devices. As described above, the propensity score represents a probability that a computing device is like other computing devices based on the configuration data collected from each computing device in the set of computing devices.

At operation 510, a matching algorithm is used to identify a sampled computing device that best represents a given unsampled computing device based on the propensity scores calculated for the set of computing devices. At operation 512, the propensity score for the unsampled computing device can be used in a function to predict the metric of interest for the unsampled computing device. Here, the function uses the metric of interest previously determined for the sampled computing device that best represents the unsampled computing device. Finally, at operation 514, the metric of interest predicted for the unsampled computing device can be used to improve the component installed on the unsampled computing device.

Figure 6:
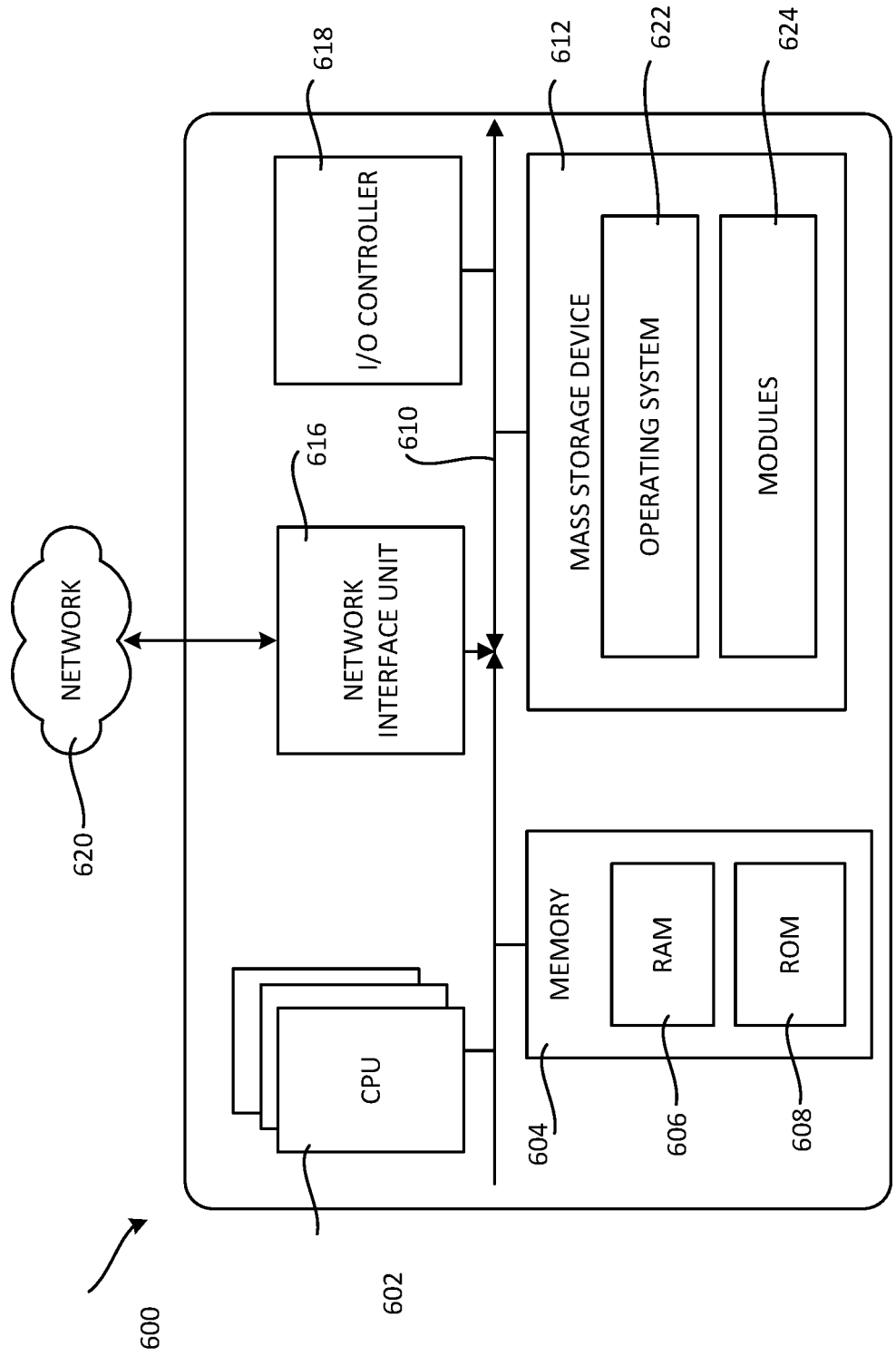
FIG. 6 is a computer architecture diagram showing an illustrative computer hardware and software architecture for a computing device that can implement aspects of the technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement a server computer, mobile phone, an e-reader, a smartphone, a desktop computer, an AR/VR device, a tablet computer, a laptop computer, or another type of computing device, such as the computing devices 104 or computing devices in the system 102.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, can be stored in the ROM 608. The computer 600 further includes a mass storage device 612 for storing an operating system 622, application programs (e.g., such as modules 624 illustrated in FIG. 1), and/or other types of programs. The mass storage device 612 can also be configured to store other types of programs and data.

The mass storage device 612 is connected to the CPU 602 through a mass storage controller connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 620 (e.g., network(s) 114). The computer 600 can connect to the network 620 through a network interface unit 616 connected to the bus 610. It should be appreciated that the network interface unit 616 can also be utilized to connect to other types of networks and remote computer systems. The computer 600 may also include an input/output controller 618 for receiving and processing input from a number of other devices, including a keyboard, mouse, touch input, an electronic stylus, or a physical sensor such as a video camera. Similarly, the input/output controller 618 can provide output to a display screen or other type of output device.

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It is also contemplated that the computer 600 might not include all of the components shown in FIG. 6, can include other components that are not explicitly shown in FIG. 6, or can utilize an architecture completely different than that shown in FIG. 6.

Figure 7:
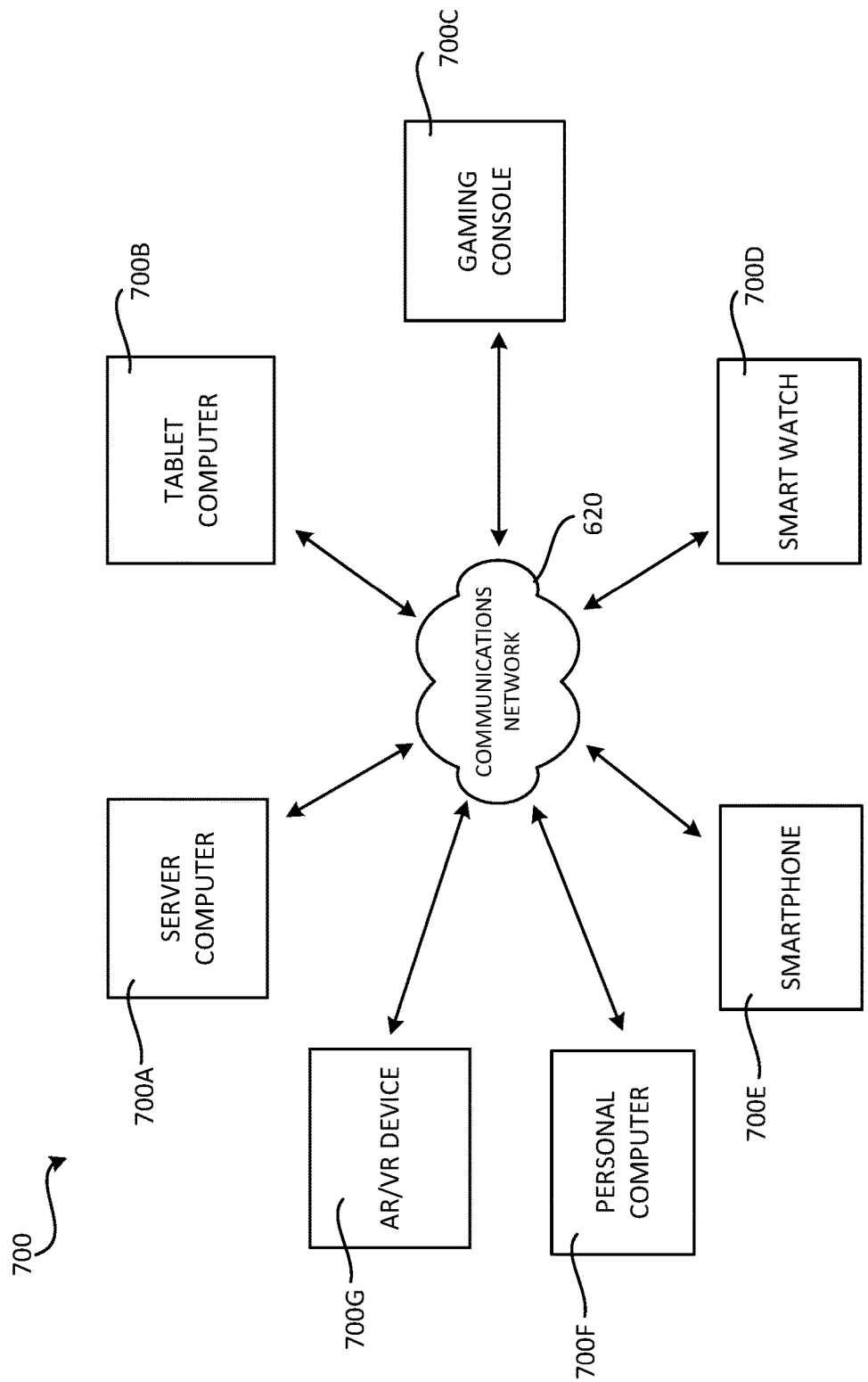
FIG. 7 is a network diagram illustrating a distributed computing environment in which aspects of the disclosed technologies can be implemented.

FIG. 7 is a network diagram illustrating a distributed network computing environment 700 in which aspects of the disclosed technologies can be implemented, according to various embodiments presented herein. As shown in FIG. 7, one or more server computers 700A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of computing devices such as, but not limited to, a tablet computer 700B, a gaming console 700C, a smart watch 700D, a smartphone 700E, such as a smartphone, a personal computer 700F, and/or an AR/VR device 700G.

In a network environment in which the communications network 620 is the Internet, for example, the server computer 700A can be a dedicated server computer operable to process and communicate data to and from the computing devices 700B-700G via any of a number of known protocols, such as, hypertext transfer protocol ("HTTP"), file transfer protocol ("FTP"), or simple object access protocol ("SOAP"). Additionally, the networked computing environment 700 can utilize various data security protocols such as secured socket layer ("SSL") or pretty good privacy ("PGP"). Each of the computing devices 700B-700G can be equipped with an operating system operable to support one or more computing applications or terminal sessions such as a web browser, or other graphical user interfaces, or a mobile desktop environment to gain access to the server computer 700A.

The data and/or computing applications may be stored on the server 700A and communicated to cooperating users through the computing devices 700B-700G over an exemplary communications network 620. A participating user may request access to specific data and applications housed in whole or in part on the server computer 700A. These data may be communicated between the computing devices 700B-700G and the server computer 700A for processing and storage.

The server computer 700A can host computing applications, processes and applets for the generation, authentication, encryption, and communication of data and applications, and may cooperate with other server computing environments, third party service providers, network attached storage ("NAS"), and storage area networks ("SAN") to realize application/data transactions.

It should be appreciated that the computing architecture shown in FIG. 6 and the distributed network computing environment shown in FIG. 7 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses.

Example Clause A, a method comprising: collecting, from each computing device in a set of computing devices, configuration data for an operating system installed on the computing device, wherein: the set of computing devices comprises a subset of sampled computing devices that have opted in to providing telemetry data indicative of usage of the operating system; the set of computing devices comprises a subset of unsampled computing devices that have not opted in to providing the telemetry data indicative of the usage of the operating system; and the configuration data includes attributes that indicate at least a geographic region in which the computing device is located, a version of the operating system installed on the computing device, and a default browser for the computing device; collecting, from each sampled computing device in the subset of sampled computing devices, the telemetry data indicative of the usage of the operating system, wherein the telemetry data is useable to determine a metric of interest for the sampled computing device; calculating, by at least one processor and based on a regression model, a propensity score for each computing device in the set of computing devices, wherein the propensity score represents a probability that the computing device is similar to other computing devices based on the configuration data collected from each computing device in the set of computing devices; for each unsampled computing device in the subset of unsampled computing devices: using k-Nearest Neighbors (k-NN) to identify, based on the propensity scores calculated for the set of computing devices, a sampled computing device that best represents the unsampled computing device; and using the propensity score for the unsampled computing device as a multiplier to determine the metric of interest for the unsampled computing device, by applying the multiplier to the metric of interest previously determined for the sampled computing device that best represents the unsampled computing device.

Example Clause B, the method of Example Clause A, wherein the propensity score predicts a label indicative of whether the computing device is one that has opted in to providing the telemetry data, the method further comprising: comparing the label to a known indicator of whether the computing device has opted in to providing the telemetry data; and updating the regression model based on the comparing.

Example Clause C, the method of Example Clause A or Example Clause B, wherein the attributes further indicate, for a computing device, at least one of: a name for the component, a stock keeping unit (SKU) for the component, a type of install for the component, whether the component was initially installed when the computing device was purchased as new or was upgraded to include the component at a time after the computing device was purchased as new, a build branch for the component, a type of use for the component, whether the component is registered to an account hosted and maintained by a provider of the component, a type of computing device, a manufacturer of the computing device, a number of compute cores in the computing device, a processor manufacturer, a processor model, a total available random access memory (RAM), or a device age.

Example Clause D, the method of any one of Example Clauses A through C, wherein the metric of interest comprises a quality of service (QOS) value.

Example Clause E, a system comprising: at least one processor; and a computer-readable storage medium having computer-executable instructions stored thereupon which, when executed by the at least one processor, cause the system to perform operations comprising: collecting, from each computing device in a set of computing devices, configuration data for a component installed on the computing device, wherein: the set of computing devices comprises a subset of sampled computing devices that provide telemetry data indicative of usage of the component; and the set of computing devices comprises a subset of unsampled computing devices that do not provide the telemetry data indicative of the usage of the component; collecting, from each sampled computing device in the subset of sampled computing devices, the telemetry data indicative of the usage of the component, wherein the telemetry data is useable to determine a metric of interest for the sampled computing device; calculating, based on a regression model, a propensity score for each computing device in the set of computing devices, wherein the propensity score represents a probability that the computing device is similar to other computing devices based on the configuration data collected from each computing device in the set of computing devices; for each unsampled computing device in the subset of unsampled computing devices: using a matching algorithm to identify, based on the propensity scores calculated for the set of computing devices, a sampled computing device that best represents the unsampled computing device; and using the propensity score for the unsampled computing device in a function to predict the metric of interest for the unsampled computing device, wherein the function uses the metric of interest previously determined for the sampled computing device that best represents the unsampled computing device.

Example Clause F, the system of Example Clause E, wherein the component comprises an operating system or an application.

Example Clause G, the system of Example Clause E or Example Clause F, wherein the matching algorithm comprises k-Nearest Neighbors (k-NN), caliper matching, radius matching, or Mahalanobis matching.

Example Clause H, the system of any one of Example Clauses E through G, wherein the propensity score predicts a label indicative of whether the computing device is one that provides the telemetry data, the operations further comprising: comparing the label to a known indicator of whether the computing device provides the telemetry data; and updating the regression model based on the comparing.

Example Clause I, the system of any one of Example Clauses E through H, wherein the configuration data includes attributes that indicate, for a computing device, at least a geographic region in which the computing device is located, a version of the component installed on the computing device, and a default browser for the computing device.

Example Clause J, the system of any one of Example Clauses E through I, wherein the configuration data includes attributes that indicate, for a computing device, at least one of: a name for the component, a stock keeping unit (SKU) for the component, a type of install for the component, whether the component was initially installed when the computing device was purchased as new or was upgraded to include the component at a time after the computing device was purchased as new, a build branch for the component, a type of use for the component, whether the component is registered to an account hosted and maintained by a provider of the component, a type of computing device, a manufacturer of the computing device, a number of compute cores in the computing device, a processor manufacturer, a processor model, a total available random access memory (RAM), or a device age.

Example Clause K, the system of any one of Example Clauses E through J, wherein the metric of interest comprises a quality of service (QOS) value.

Example Clause L, the system of any one of Example Clauses E through K, wherein the operations further comprise using the metric of interest predicted for the unsampled computing device to improve the component installed on the unsampled computing device.

Example Clause M, a method comprising: collecting, from each computing device in a set of computing devices, configuration data for a component installed on the computing device, wherein: the set of computing devices comprises a subset of sampled computing devices that provides telemetry data indicative of usage of the component; and the set of computing devices comprises a subset of unsampled computing devices that does not provide the telemetry data indicative of the usage of the component; collecting, from each sampled computing device in the subset of sampled computing devices, the telemetry data indicative of the usage of the component, wherein the telemetry data is useable to determine a metric of interest for the sampled computing device; calculating, based on a regression model, a propensity score for each computing device in the set of computing devices, wherein the propensity score represents a probability that the computing device is similar to other computing devices based on the configuration data collected from each computing device in the set of computing devices; for each unsampled computing device in the subset of unsampled computing devices: using an algorithm to match, based on the propensity scores calculated for the set of computing devices, the unsampled computing device with a sampled computing device; designating the propensity score for the unsampled computing device as a multiplier; and applying the multiplier to the metric of interest previously determined for the sampled computing device to predict the metric of interest for the unsampled computing device.

Example Clause N, the method of Example Clause M, wherein the component comprises an operating system or an application.

Example Clause O, the method of Example Clause M or Example Clause N, wherein the algorithm comprises k-Nearest Neighbors (k-NN), caliper matching, radius matching, or Mahalanobis matching.

Example Clause P, the method of any one of Example Clause M through O, wherein the propensity score predicts a label indicative of whether the computing device is one that provides the telemetry data, the method further comprising: comparing the label to a known indicator of whether the computing device provides the telemetry data; and updating the regression model based on the comparing.

Example Clause Q, the method of any one of Example Clause M through P, wherein the configuration data includes attributes that indicate, for a computing device, at least a geographic region in which the computing device is located, a version of the component installed on the computing device, and a default browser for the computing device.

Example Clause R, the method of any one of Example Clause M through Q, wherein the configuration data includes attributes that indicate, for a computing device, at least one of: a name for the component, a stock keeping unit (SKU) for the component, a type of install for the component, whether the component was initially installed when the computing device was purchased as new or was upgraded to include the component at a time after the computing device was purchased as new, a build branch for the component, a type of use for the component, whether the component is registered to an account hosted and maintained by a provider of the component, a type of computing device, a manufacturer of the computing device, a number of compute cores in the computing device, a processor manufacturer, a processor model, a total available random access memory (RAM), or a device age.

Example Clause S, the method of any one of Example Clause M through R, wherein the metric of interest comprises a quality of service (QOS) value.

Example Clause T, the method of any one of Example Clause M through S, further comprising using the metric of interest predicted for the unsampled computing device to improve the component installed on the unsampled computing device.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different computing devices, two different propensity scores).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method comprising:
    collecting, from each computing device in a set of computing devices, configuration data for an operating system installed on the computing device, wherein:
        the set of computing devices comprises a subset of sampled computing devices that have opted in to providing telemetry data indicative of usage of the operating system;
        the set of computing devices comprises a subset of unsampled computing devices that have not opted in to providing the telemetry data indicative of the usage of the operating system; and
        the configuration data includes attributes that indicate at least a geographic region in which the computing device is located, a version of the operating system installed on the computing device, and a default browser for the computing device;
    collecting, from each sampled computing device in the subset of sampled computing devices, the telemetry data indicative of the usage of the operating system, wherein the telemetry data is useable to determine a metric of interest for the sampled computing device;
    calculating, by at least one processor and based on a regression model, a propensity score for each computing device in the set of computing devices, wherein the propensity score represents a probability that the computing device is similar to other computing devices based on the configuration data collected from each computing device in the set of computing devices;
    for each unsampled computing device in the subset of unsampled computing devices:
        using k-Nearest Neighbors (k-NN) to identify, based on the propensity scores calculated for the set of computing devices, a sampled computing device that best represents the unsampled computing device; and
        using the propensity score for the unsampled computing device as a multiplier to determine the metric of interest for the unsampled computing device, by applying the multiplier to the metric of interest previously determined for the sampled computing device that best represents the unsampled computing device.

2. The method of claim 1, wherein the propensity score predicts a label indicative of whether the computing device is one that has opted in to providing the telemetry data, the method further comprising:
    comparing the label to a known indicator of whether the computing device has opted in to providing the telemetry data; and
    updating the regression model based on the comparing.

3. The method of claim 1, wherein the attributes further indicate, for a computing device, at least one of: a name for the component, a stock keeping unit (SKU) for the component, a type of install for the component, whether the component was initially installed when the computing device was purchased as new or was upgraded to include the component at a time after the computing device was purchased as new, a build branch for the component, a type of use for the component, whether the component is registered to an account hosted and maintained by a provider of the component, a type of computing device, a manufacturer of the computing device, a number of compute cores in the computing device, a processor manufacturer, a processor model, a total available random access memory (RAM), or a device age.

4. The method of claim 1, wherein the metric of interest comprises a quality of service (QOS) value.

5. A system comprising:
- at least one processor; and
- a computer-readable storage medium having computer-executable instructions stored thereupon which, when executed by the at least one processor, cause the system to perform operations comprising:
  - collecting, from each computing device in a set of computing devices, configuration data for a component installed on the computing device, wherein:
    - the set of computing devices comprises a subset of sampled computing devices that provide telemetry data indicative of usage of the component; and
    - the set of computing devices comprises a subset of unsampled computing devices that do not provide the telemetry data indicative of the usage of the component;
  - collecting, from each sampled computing device in the subset of sampled computing devices, the telemetry data indicative of the usage of the component, wherein the telemetry data is useable to determine a metric of interest for the sampled computing device;
  - calculating, based on a regression model, a propensity score for each computing device in the set of computing devices, wherein the propensity score represents a probability that the computing device is similar to other computing devices based on the configuration data collected from each computing device in the set of computing devices;
  - for each unsampled computing device in the subset of unsampled computing devices:
    - using a matching algorithm to identify, based on the propensity scores calculated for the set of computing devices, a sampled computing device that best represents the unsampled computing device; and
    - using the propensity score for the unsampled computing device in a function to predict the metric of interest for the unsampled computing device, wherein the function uses the metric of interest previously determined for the sampled computing device that best represents the unsampled computing device.

6. The system of claim 5, wherein the component comprises an operating system or an application.

7. The system of claim 5, wherein the matching algorithm comprises k-Nearest Neighbors (k-NN), caliper matching, radius matching, or Mahalanobis matching.

8. The system of claim 5, wherein the propensity score predicts a label indicative of whether the computing device is one that provides the telemetry data, the operations further comprising:
- comparing the label to a known indicator of whether the computing device provides the telemetry data; and
- updating the regression model based on the comparing.

9. The system of claim 5, wherein the configuration data includes attributes that indicate, for a computing device, at least a geographic region in which the computing device is located, a version of the component installed on the computing device, and a default browser for the computing device.

10. The system of claim 5, wherein the configuration data includes attributes that indicate, for a computing device, at least one of: a name for the component, a stock keeping unit (SKU) for the component, a type of install for the component, whether the component was initially installed when the computing device was purchased as new or was upgraded to include the component at a time after the computing device was purchased as new, a build branch for the component, a type of use for the component, whether the component is registered to an account hosted and maintained by a provider of the component, a type of computing device, a manufacturer of the computing device, a number of compute cores in the computing device, a processor manufacturer, a processor model, a total available random access memory (RAM), or a device age.

11. The system of claim 5, wherein the metric of interest comprises a quality of service (QoS) value.

12. The system of claim 5, wherein the operations further comprise using the metric of interest predicted for the unsampled computing device to improve the component installed on the unsampled computing device.

13. A method comprising:
- collecting, from each computing device in a set of computing devices, configuration data for a component installed on the computing device, wherein:
  - the set of computing devices comprises a subset of sampled computing devices that provides telemetry data indicative of usage of the component; and
  - the set of computing devices comprises a subset of unsampled computing devices that does not provide the telemetry data indicative of the usage of the component;
- collecting, from each sampled computing device in the subset of sampled computing devices, the telemetry data indicative of the usage of the component, wherein the telemetry data is useable to determine a metric of interest for the sampled computing device;
- calculating, based on a regression model, a propensity score for each computing device in the set of computing devices, wherein the propensity score represents a probability that the computing device is similar to other computing devices based on the configuration data collected from each computing device in the set of computing devices;
- for each unsampled computing device in the subset of unsampled computing devices:
  - using an algorithm to match, based on the propensity scores calculated for the set of computing devices, the unsampled computing device with a sampled computing device;
  - designating the propensity score for the unsampled computing device as a multiplier; and applying the multiplier to the metric of interest previously determined for the sampled computing device to predict the metric of interest for the unsampled computing device.

14. The method of claim 13, wherein the component comprises an operating system or an application.

15. The method of claim 13, wherein the algorithm comprises k-Nearest Neighbors (k-NN), caliper matching, radius matching, or Mahalanobis matching.

16. The method of claim 13, wherein the propensity score predicts a label indicative of whether the computing device is one that provides the telemetry data, the method further comprising:
   comparing the label to a known indicator of whether the computing device provides the telemetry data; and
   updating the regression model based on the comparing.

17. The method of claim 13, wherein the configuration data includes attributes that indicate, for a computing device, at least a geographic region in which the computing device is located, a version of the component installed on the computing device, and a default browser for the computing device.

18. The method of claim 13, wherein the configuration data includes attributes that indicate, for a computing device, at least one of: a name for the component, a stock keeping unit (SKU) for the component, a type of install for the component, whether the component was initially installed when the computing device was purchased as new or was upgraded to include the component at a time after the computing device was purchased as new, a build branch for the component, a type of use for the component, whether the component is registered to an account hosted and maintained by a provider of the component, a type of computing device, a manufacturer of the computing device, a number of compute cores in the computing device, a processor manufacturer, a processor model, a total available random access memory (RAM), or a device age.

19. The method of claim 13, wherein the metric of interest comprises a quality of service (QOS) value.

20. The method of claim 13, further comprising using the metric of interest predicted for the unsampled computing device to improve the component installed on the unsampled computing device.

* * * * *